(12) United States Patent
Deshpande et al.

(10) Patent No.: US 10,911,549 B2
(45) Date of Patent: Feb. 2, 2021

(54) PROXY ROUTING BASED ON PATH HEADERS

(71) Applicant: T-Mobile USA, Inc., Bellevue, WA (US)

(72) Inventors: Mallika Deshpande, Sammamish, WA (US); Prannoy Kiran Saride, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 15 days.

(21) Appl. No.: 16/526,837

(22) Filed: Jul. 30, 2019

(65) Prior Publication Data

US 2020/0336554 A1 Oct. 22, 2020

Related U.S. Application Data

(60) Provisional application No. 62/835,247, filed on Apr. 17, 2019.

(51) Int. Cl.
  *H04L 29/08* (2006.01)
  *H04L 29/06* (2006.01)
(52) U.S. Cl.
  CPC ........... *H04L 67/16* (2013.01); *H04L 67/02* (2013.01); *H04L 67/42* (2013.01); *H04L 69/22* (2013.01)
(58) Field of Classification Search
  None
  See application file for complete search history.

(56) References Cited

U.S. PATENT DOCUMENTS

| | | | | |
|---|---|---|---|---|
| 2016/0127320 A1* | 5/2016 | Badoni | ............... | H04L 63/0272 726/12 |
| 2018/0097891 A1* | 4/2018 | Calo | ............... | H04L 45/24 |
| 2019/0196837 A1* | 6/2019 | Gagnon | ............... | G06F 9/45558 |
| 2020/0036754 A1* | 1/2020 | Livanos | ............... | H04W 8/12 |

FOREIGN PATENT DOCUMENTS

WO    WO-2019096586 A1 *  5/2019   ............ H04W 12/08

OTHER PUBLICATIONS

"3rd Generation Partnership Project; Technical Specification Group Services and System Aspect; Study on Enhancements to the Service-Based Architecture (Release 16)", 3gpp Standard; Technical Report; 3GPP TR 23.742, 3rd Generation Partnership Project (3GPP), Mobile Competence Centre; No. V16.0.0, Dec. 2018, pp. 1-131.
Anonymous, HTTP(S) Load Balancing Concepts, Load Balancing, Google Cloud, Mar. 2019, pp. 1-16.
The Extended European Search Report dated Jun. 30, 2020 for European Patent Application No. 20168304.2, 10 pages.

* cited by examiner

*Primary Examiner* — Jeffrey R Swearingen
(74) *Attorney, Agent, or Firm* — Lee & Hayes, P.C.

(57) ABSTRACT

A proxy in a service-based telecommunication network, such as a fifth generation (5G) network, can receive a request a from a consumer network function (NF) and route the request to a producer NF. The request can be addressed to the proxy at an Internet Protocol (IP) layer, but include a path header, such as a Hypertext Transfer Protocol Two (HTTP/2) path pseudo-header field, that indicates a type of producer NF and a type of service. The proxy can select a particular instance of that type of producer NF based on the path header and can forward the request to an IP address of the selected producer NF that corresponds to the type of service indicated in the path header.

20 Claims, 4 Drawing Sheets

PROXY ROUTING BASED ON PATH HEADERS

RELATED APPLICATIONS

This U.S. Patent Application claims priority to provisional U.S. Patent Application No. 62/835,247, entitled "5G ROUTING BASED ON PATH HEADERS," filed on Apr. 17, 2019, the entirety of which is incorporated herein by reference.

BACKGROUND

Some service-based telecommunication networks, such as fifth generation (5G) networks, can use interactions between various network functions (NFs) to implement services. For example, a consumer NF can request a particular service provided by a different producer NF. Multiple types of NFs in the telecommunication network can act as consumer NFs and/or producer NFs.

In some examples, a consumer NF can request services from a producer NF using a Hypertext Transfer Protocol Two (HTTP/2) message that includes various pseudo-headers, such as an authority header and a path header.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
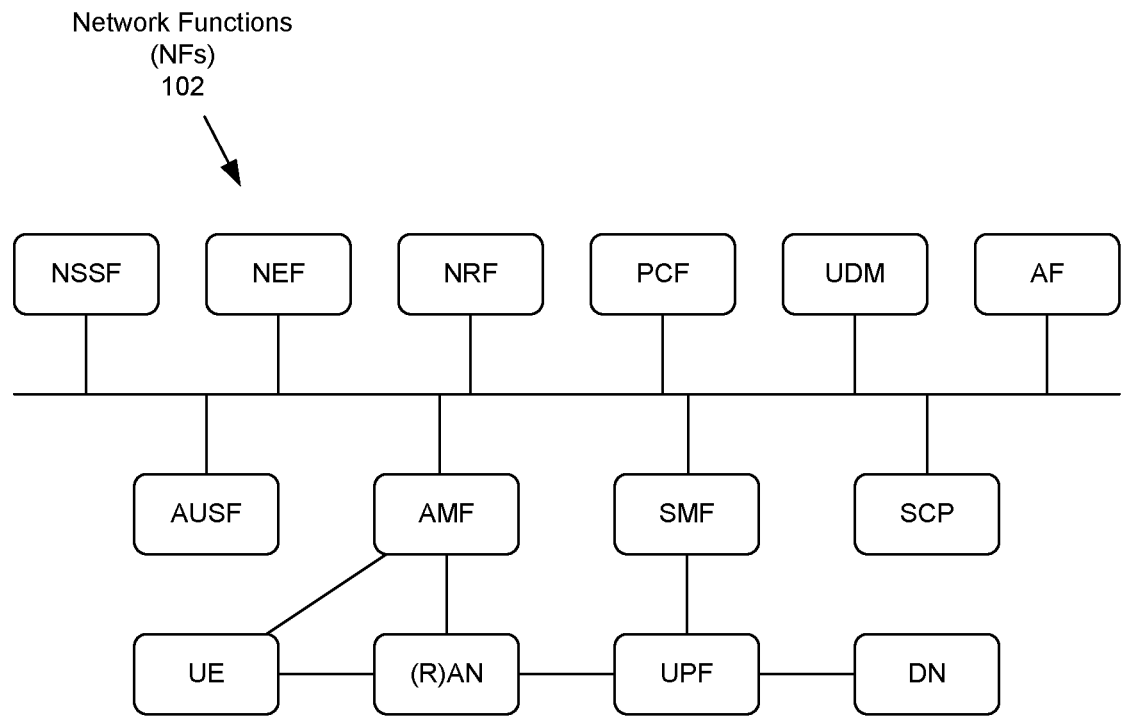
FIG. 1 depicts an example service-based system architecture for a telecommunication network.

In telecommunication networks with service-based system architectures, such as fifth generation (5G) networks, various network functions (NFs) can interact to implement services for subscribers and other users. A first NF that requests a service from a second NF in such a telecommunication network can be referred to as a consumer NF, while the second NF that provides the service can be referred to as a producer NF. In some examples, multiple instances of a producer NF can be grouped into an NF set that all offer identical services, such that a consumer NF can obtain a requested service from any particular instance of a producer NF in an NF set.

Recently, indirect communication modes have been introduced in some service-based telecommunication networks wherein consumer NFs send requests to a transparent proxy, and the transparent proxy then routes the requests to producer NFs. In some systems that use such indirect communication modes, a consumer NF may address an outgoing request at an Internet Protocol (IP) layer to an IP address of a transparent proxy. However, the consumer NF may embed an IP address of a specific producer NF in header information of the request, such as within an authority pseudo-header field of a Hypertext Transfer Protocol Two (HTTP/2) message. The request from the consumer NF can be routed to the transparent proxy based on the request being addressed at the IP layer to the IP address of the transparent proxy. However, after the proxy receives the request, the transparent proxy can forward the request without modification on to the producer NF based on the IP address of the producer NF that was originally included in the header information, such as within an authority pseudo-header field of an HTTP/2 message. In some examples, after a session has begun between a consumer NF and a producer NF via a proxy, indirect communication modes can allow the proxy to select a different instance of the producer NF in an NF set than was originally used for a service, for instance if the original instance of the producer NF in the NF set is no longer available.

Although indirect communication modes can be useful in some situations, in many previous solutions the consumer NF would need to initially obtain or be preconfigured with a large set of IP addresses associated with instances of producer NFs and/or the services offered by such producer NFs. The consumer NF can use this large set of IP addresses to select one particular IP address corresponding to a combination of a particular instance of a producer NF and a particular service offered by that producer NF. The consumer NF can then embed the selected IP address in authority header information of a request, such as in an HTTP/2 authority pseudo-header field. The proxy can receive the request due to the request being addressed to at the IP layer to the proxy. The proxy can find the IP address of a specific producer NF added by the consumer NF in the authority header information, and can route the request on to that IP address. In these previous solutions, because the proxy relies on a specific IP address for the ultimate endpoint for a request having already been inserted into authority header information by the consumer NF, the burden falls to the consumer NF to discover and/or select a specific IP address for a specific instance of a producer NF out of a large set of possible IP addresses and to insert that IP address in authority header information of a new request being sent to a proxy.

However, overall it can be burdensome to configure each instance of a consumer NF in a telecommunication network with such a large set of possible IP addresses the consumer NF may need to request various services from various types of producer NFs. For example, in some cases hundreds of IP addresses may be associated with just one particular instance or type of producer NF, and/or the services offered by that instance of type of producer NF. Because a particular consumer NF may need to request services from various types of producer NFs, the consumer NF may need to obtain information about multiple large sets of IP addresses for each type of producer NF and/or type of service. It can be difficult and/or time consuming to configure just one consumer NF with this data, let alone configuring numerous instances of consumer NFs that may be present in a telecommunication network with such data. It can also be burdensome to update locally stored sets of IP addresses at numerous consumer NFs when new producer NFs are brought offline or old producer NFs go offline. Storing such sets of IP addresses at consumer NFs can also pose memory storage issues, and each consumer NF must also be configured with selection processes to actually select one of the many possible IP addresses in such data sets for a particular producer NF when generating a new request for a service.

Described herein are systems and processes by which a consumer NF can send a request for a service to a proxy, without specifying a particular IP address of a particular producer NF. The systems and processes described herein can thereby simplify configurations of consumer NFs, as the consumer NF may only need to be configured with or obtain an IP address of the proxy itself. The request can include path header information about a type of producer NF and/or service the consumer NF is requesting, such that the proxy can use that path header information to select a corresponding producer NF and forward the request on to an IP address of the producer NF selected by the proxy.

Example Environment

FIG. 1 depicts an example service-based system architecture for a telecommunication network. A telecommunication network can be a network with a service-based system architecture in which multiple network functions (NFs) 102 can communicate to implement services. In some examples, the telecommunication network can be a fifth generation (5G) network. In other examples, the telecommunication network can be a network of any other generation that uses NFs 102 to implement services.

Each NF 102 can be a hardware and/or software element in the telecommunication network. For example, an NF 102 can be implemented as a dedicated hardware element, as software on a dedicated hardware element, or as a virtualized function running on cloud servers or other computing devices.

In some examples an NF 102 can be one of the NFs 102 listed in 3GPP TS 23.501 Section 4.2.2, such as an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), or Wireline Access Gateway Function (W-AGF), many of which are shown in the example system architecture of FIG. 1. However, in other examples, an NF 102 can be any other network function, entity, element, or node.

In some examples, multiple instances of the same type of NF 102 can be grouped into an NF set. Accordingly, any particular instance within an NF 102 set may be substantially identical to other instances in the same NF set and/or be able to provide the same types of services to other NFs 102.

Figure 2:
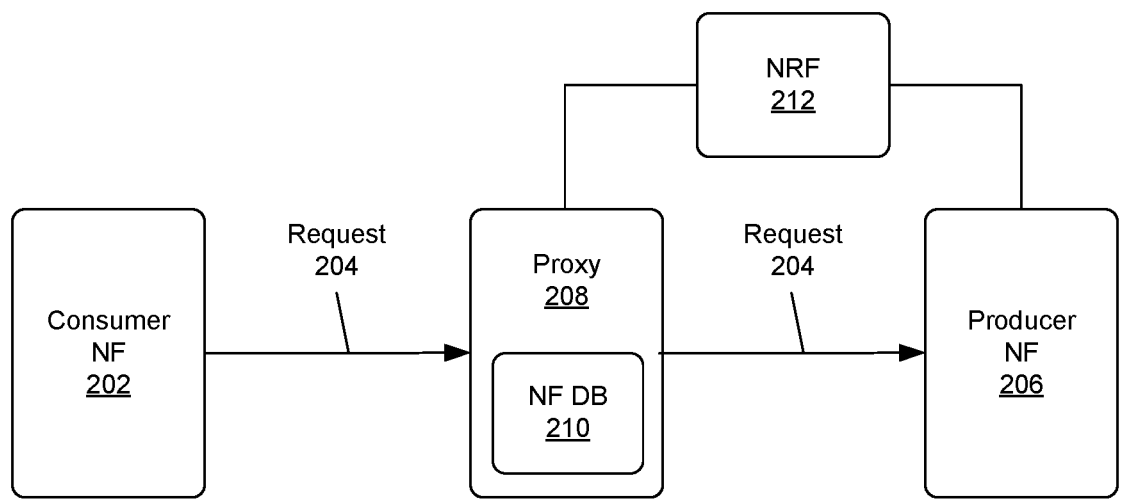
FIG. 2 depicts an example of a consumer network function (NF) sending a request to a producer NF via a proxy.

FIG. 2 depicts an example of a consumer NF 202 sending a request 204 to a producer NF 206 via a proxy 208. As discussed above, different NFs 102 in a telecommunication network can interact with each other to implement services. During such interactions between NFs 102, a first NF 102 can send a request 204 for a service to a second NF 102 that offers that service. In some examples, the request 204 can be a Hypertext Transfer Protocol (HTTP) message, such as an HTTP/1.x or HTTP/2 message.

As shown in FIG. 2, a first NF 102 that is the source of a request 204 can be referred to as a consumer NF 202, while a second NF 102 that is the destination of the request 204 can be referred to as a producer NF 206. As an example, to implement a service for a particular subscriber or user within the service-based system architecture shown in FIG. 1, an AMF can request a service provided by a UDM, such as a subscriber data management (SDM) service. In this example, the AMF would be a consumer NF 202 in FIG. 2 that sends a request 204 for the SDM service to a UDM, and the UDM would be a producer NF 206 in FIG. 2.

Consumer NFs 202 are not limited to AMFs, as other types of NFs 102 can also be consumer NFs 202. Similarly, producer NFs 206 are not limited to UDMs, as other types of NFs 102 can also be producer NFs 206. For instance, in another example a consumer NF 202 can be an SMF that requests services from a PCF acting as a producer NF 206. In some situations, a first NF 102 can be a consumer NF 202 when the first NF 102 requests services from a second NF 102 acting as a producer NF 206, but the two NFs 102 can switch roles if the second NF 102 later requests services from the first NF 102 such that the second NF 102 becomes a consumer NF 202 and the first NF 102 becomes a producer NF 206.

As shown in FIG. 2, a proxy 208 can be provided in the telecommunication network to route requests 204 between consumer NFs 202 and producer NFs 206. In some examples, the proxy 208 can itself be an NF 102, such as the Service Communication Proxy (SCP) shown in FIG. 1. Example architecture for a computing device that can execute the proxy 208 is illustrated in greater detail in FIG. 4 and is described in detail below with reference to that figure.

As will be discussed further below, a consumer NF 202 can address a request 204 to a proxy 208 at an Internet Protocol (IP) layer, but use path header information within the request 204 to identify a type of producer NF 206 and/or service associated with the request 204. The proxy 208 can examine the path header information of the request 204 to determine what type of producer NF 206 and/or what type of service is associated with the request 204. The proxy 208 can select a particular producer NF 206 that matches the producer NF type and/or type of service indicated in the path header information of the request 204, and can forward the request 204 on to the producer NF 206 selected by the proxy 208.

The proxy 208 can store, or have access to, an NF database 210. The NF database 210 can be one or more databases or data stores that maintain information associating IP addresses associated with individual NFs 102 of various types and/or services offered by those NFs 102. For example, the NF database 210 can contain a first set of IP addresses of UDFs, a second set of IP addresses of PCFs, and/or other sets of IP addresses for other types of NFs 102. In some examples, each particular instance of a producer NF 206 may expose multiple IP addresses for different types of services offered by that producer NF 206, and accordingly those multiple IP addresses for different services provided by a particular instance of a producer NF 206 can be stored in the NF database 210. The proxy 208 can accordingly use the information in the NF database 210 to select a particular instance of a producer NF 206 in response to receiving a request 204 from a consumer NF 202, and to determine an IP address of the selected producer NF 206 that corresponds to a service identified in the request 204.

In some examples, IP address information in the NF database 210 of the proxy 208 can be statically configured by an entity, such as by an operator of the telecommunication network. In other examples, the proxy 208 can dynamically build or update the NF database 210 by retrieving information about NFs 102 registered in the telecommunication network from another NF 102 known as a Network Repository Function (NRF) 212. When NFs 102 boot up or otherwise come online in the telecommunication network, the NFs 102 can register with an NRF 212. For example, during registration the NFs 102 can provide information to the NRF 212 about the services offered by the NFs 102, IP addresses the NFs 102 are exposing, and/or other registration information. Accordingly, in some examples, the proxy 208 can retrieve IP address information and/or other information about currently registered NFs 102 from the NRF 212 to dynamically build or update the NF database 210 of the proxy 208. For instance, the proxy 208 can perform an initial discovery of IP address information of producer NFs 206 from the registration information stored at the NRF 212, and subscribe and notify messages can then be used to obtain updated IP information of producer NFs 206 when the NRF 212 receives new or altered registration data about producer NFs 206.

In some examples, the NF database 210 can also store load balancing information about NFs 102 in the telecommunication network. For example, the NF database 210 can store load balancing information to track which NFs 102 are online, to track current loads of individual NFs 102, track the status and/or health of individual NFs 102, and/or track any other information about individual NFs 102. In some examples, the proxy 208 can occasionally or periodically send status request messages to NFs 102 to poll which NFs 102 are available and/or to obtain other status information about the NFs 102. In some examples, the proxy 208 can use information obtained from an NRF 212 to track which NFs 102 are online, but poll such NFs 102 directly to obtain information such as current load, capacity, status, and/or health information about the NFs 102.

The proxy 208 may accordingly use load balancing information in the NF database 210 to perform load balancing between NFs 102 when selecting specific instances of producer NFs 206 for consumer NFs 202 upon receiving requests 204. For example, if the proxy 208 receives a request 204 from a consumer NF 202 that indicates the request 204 is for a service from a UDM, there may be multiple UDM instances in an NF set in the telecommunication network that could potentially provide the requested service. However, if the load balancing information indicates that one UDM instance in the NF set is currently serving the least number of consumer NFs 202 or has the most available capacity for additional connections to consumer NFs 202, the proxy 208 may select that particular UDM instance for the consumer NF 202 and forward the request 204 to that particular UDM instance. In other examples, the proxy 208 may perform load balancing among instances of producer NFs 206 in an NF set in other ways, such as by using random selection, round robin selection, or other load balancing techniques.

In some examples, the NF database 210 can also store session information associating specific consumer NFs 202 with specific producer NFs 206. For example, when the proxy 208 receives a request 204 from a consumer NF 202 and selects a particular instance of a producer NF 206 from an NF set for the consumer NF 202, the proxy 208 can store data associating an identifier of the consumer NF 202 with an identifier of the particular instance of the producer NF 206 that the proxy 208 selected for the consumer NF 202. Although each instance of a producer NF 206 in an NF set may offer the same services, once a consumer NF 202 is connected to a particular instance of the producer NF 206 and a session has been initiated between the consumer NF 202 and the particular instance of the producer NF 206, the producer NF 206 may have unique information about the session that other instances of the producer NF 206 in the NF set do not have. Accordingly, if that connection is broken for any reason and the consumer NF 202 sends a new request 204 to the proxy 208 that identifies the same type of producer NF 206 and same type of service as a previous request 204, in some examples the proxy 208 can use the session information in the NF database 210 to select the instance of the producer NF 206 to which the consumer NF 202 had previously been connected.

Figure 3:
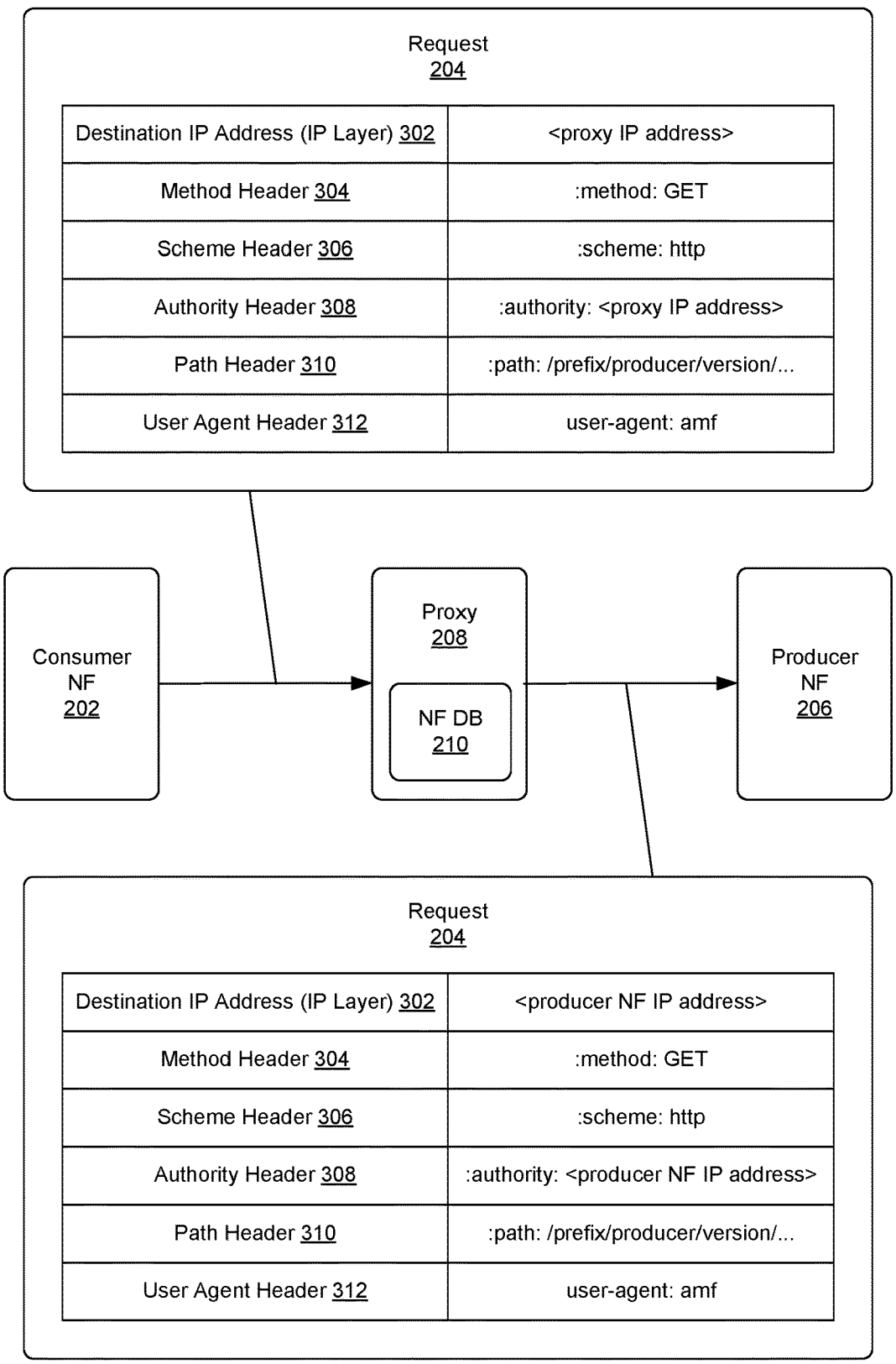
FIG. 3 depicts examples of information within a request when the request is received by a proxy from a consumer NF, and when the request is forwarded by a proxy to a producer NF.

FIG. 3 depicts examples of information within a request 204 when the request 204 is received by a proxy 208 from a consumer NF 202, and when the request 204 is forwarded by a proxy 208 to a producer NF 206. A request 204 can indicate, at an IP layer, a destination IP address 302. When a consumer NF 202 generates and sends a request 204, the consumer NF 202 can use an IP address of the proxy 208 as the destination IP address 302 of the request 204. In some examples, the consumer NF 202 can be preconfigured to use the IP address of the proxy 208. In other examples, the consumer NF 202 can request an IP address from the NRF 212, and the NRF 212 can return the IP address of the proxy 208 for the consumer NF 202 to use as the destination IP address 302 of the request 204. In some of these examples, the consumer NF 202 may request IP addresses of producer NFs 206, but the NRF 212 may be configured to instead return a single IP address of a proxy 208 to a requesting consumer NF 202 so that the consumer NF 202 directs its requests 204 to that proxy 208 in an indirect communication mode.

The request 204 can also contain header information, including a method header 304, a scheme header 306, an authority header 308, and/or a path header 310. The method header 304 can indicate an HTTP method associated with the request 204, such as "GET," "POST," or other HTTP methods. The scheme header 306 can indicate a scheme portion of a target uniform resource indicator (URI), such as "http" or "https." The authority header 308 can indicate an authority portion of a target URI. In some examples, the authority header 308 can identify an IP address as a host portion of a target URI, and may be followed by a port number in some situations. In other examples, the authority header 308 can be absent or empty. The path header 310 can indicate path and query portions of a target URI.

In some examples, the request 204 can be an HTTP/2 message. In these examples, the method header 304, scheme header 306, authority header 308, and path header 310 can be expressed in HTTP/2 pseudo-header fields. HTTP/2 pseudo-header fields may be different from other HTTP header fields, but can be indicated with a leading ":" character within an HTTP/2 headers frame. In alternate examples, information associated with the method header 304, the scheme header 306, the authority header 308, and/or the path header 310 can expressed in other formats. For example, if the request 204 is an HTTP 1.x message, a message start-line can be used to convey the target URI as a combination or concatenation of at least parts of the scheme header 306, the authority header 308, and/or the path header 310, and to convey the method of the request similar to the method header 304.

When a consumer NF 202 generates and sends a request 204, the consumer NF 202 can indicate path and query portions of a target URI in a path header 310 of the request 204. Accordingly, the consumer NF 202 can include a string in the path header 310 that identifies a type of producer NF 206 and a type of service the consumer NF 202 is requesting from that type of producer NF 206. In various examples, one or more substrings with the path header 310 can indicate a type of producer NF 206 and a type of service, while those substrings can be preceded by prefixes or followed by suffixes that indicate other types of data or other information about the path and/or query portions of a target URI. The proxy 208 can accordingly correlate one or more substrings from the path header 310 against information in the NF database 210 about known producer NFs 206 and/or services provided by such known producer NFs 206, as described further below.

For example, when a consumer NF 202 is requesting a Session Management Policy Control Service from a PCF, the consumer NF 202 can include a string for an HTTP/2 pseudo-header field such as ":path: /USEast/npcf-smpolicy-control/v1/sm-policies" as the path header 310 of a request 204. Within this example string in the path header 310, "npcf" can indicate that the request 204 is for a PCF, while "smpolicycontrol" can indicate that the request 204 is for a Session Management Policy Control Service from such a PCF. As another example, when the consumer NF 202 is requesting a Subscriber Data Management (SDM) service from a UDM, the consumer NF 202 can include a string for an HTTP/2 pseudo-header field such as ":path: /nudm-sdm/v1/" followed by an International Mobile Subscriber Identity (IMSI) number for a subscriber and/or other data as the path header 310 of a request 204. Within this example string in the path header 310, "nudm" can indicate that the request 204 is for a UDM, while "sdm" can indicate that the request 204 is for a SDM service from such a UDM.

Although a consumer NF 202 can identify a specific type of producer NF 206 and a specific type of service within a path header 310 of a request 204, the consumer NF 202 can include the IP address of the proxy 208 in the authority header 308 instead of an IP address for an instance of the type of producer NF 206 identified in the path header 310. For example, although a consumer NF 202 can include a string for an HTTP/2 pseudo-header field such as ":path: /nudm-sdm/v1/ . . . " as the path header 310 of a request 204 to indicate that the consumer NF 202 is attempting to request an SDM service from a UDM, the consumer NF 202 can include an authority header 308 that specifies the IP address of the proxy 208. In some examples, the authority header 308 may indicate both an IP address of the proxy 208 and a particular port number. For instance, the authority header 308 can be an HTTP/2 authority pseudo-header field storing a string formatted as ":authority: <proxy IP address>:<port number>." In alternate examples, the consumer NF 202 can omit an authority header 308 or leave the authority header 308 empty.

Accordingly, when a consumer NF 202 sends a request 204, the IP address of a proxy 208 can be indicated as the destination IP address 302 in an IP layer and possibly also within an authority header 308, while a type of producer NF 206 and a type of service being requested from that type of producer NF 206 can be indicated in the path header 310. In some examples, the request 204 can also include other types of header information, such as a user agent header 312 that identifies a type of the consumer NF 202. For example, when the consumer NF 202 is an AMF, the request 204 can include a user agent header 312 such as "user-agent: amf."

Due to the inclusion of the IP address of the proxy 208 at the IP layer in the destination IP address 302 of the request 204, the request 204 can be routed from the consumer NF 202 through the telecommunication network to the proxy 208. The proxy 208 can receive the request 204 and can examine the path header 310 to identify a type of producer NF 206 and a type of service indicated within the request 204. For example, the proxy 208 can parse a string found in the path header 310 to find or extract one or more character sets or substrings that correspond to predefined types of producer NFs 206 and/or types of services offered by such producer NFs 206. For example, if the proxy 208 identifies the substring "nudm-sdm" within a portion of the string in the path header 310, the proxy 208 can determine that the request 204 is for a UDM and is requesting an SDM service from a UDM. In some examples, the NF database 210 or other data stored or accessible by the proxy 208 can indicate predefined sets of characters or strings for various types of producer NFs 206 and/or types of services offered by such producer NFs 206.

After the proxy 208 has determined what type of producer NF 206 and/or type of service the consumer NF 202 is requesting based on the path header 310 in the request 204, the proxy 208 can use the NF database 210 to identify instances of the requested type of producer NF 206 in an NF set. The proxy 208 can select a particular instance of the producer NF 206 in the NF set for the consumer NF 202. In some examples, the proxy 208 can also use load balancing information and/or session information in the NF database 210 to select the particular instance of the producer NF 206, for instance to perform load balancing between available instances of the producer NF 206 in an NF set or to reconnect the consumer NF 202 with a particular instance of a producer NF 206 to which the consumer NF 202 had previously been connected.

During or after selection of the instance of the producer NF 206 for the consumer NF 202, the proxy 208 can also use the NF database 210 to identify an IP address for the selected producer NF 206 that is associated with the type of service indicated in the path header 310 of the request 204. For example, a particular instance of the producer NF 206 may expose multiple IP addresses for different types of services offered by that producer NF 206, and those multiple IP addresses can be stored in the NF database 210. The proxy 208 can use the NF database 210 to select one of the available IP addresses for the selected producer NF 206 that matches the particular type of service indicated in the path header 310 of the request 204. In some examples, the proxy 208 can also store the selected IP address and/or identifier of the selected producer NF 206 in association with an identifier for the consumer NF 202 in session information in the NF database 210.

The proxy 208 can modify the authority header 308 of the request 204 to indicate the IP address for the selected producer NF 206 that is associated with the requested type of service. In some examples, the proxy 208 can also indicate a port number in the modified authority header 308. For example, although the proxy 208 may have received the request 204 from the consumer NF 202 with an authority header 308 formatted as an HTTP/2 pseudo-header string including ":authority: <proxy IP address>," after selecting a particular instance of a producer NF 206 and determining an IP address for that producer NF 206 that is associated with a requested type of service, the proxy 208 can modify the authority header 308 to instead include an HTTP/2 pseudo-header string such as ":authority: <producer NF IP address>." As another example, if a consumer NF 202 omitted the authority header 308 or left the authority header 308 blank, the proxy 208 can modify the request to add or fill in an authority header 308 that indicates the IP address selected by the proxy 208 for a selected producer NF 206 that is associated with the requested type of service.

The proxy 208 can also include the IP address for the selected producer NF 206 as the destination IP address 302 at the IP layer in the modified request 204, and can send the modified request 204 to that IP address for the selected producer NF 206. Accordingly, although the proxy 208 receives the request 204 from a consumer NF 202 with the IP address of the proxy 208 indicated in the destination IP address 302 at the IP layer and in the authority header 308, the outgoing modified request 204 sent to a producer NF 206 selected by the proxy 208 can indicate the IP address of the selected producer NF 206 in both the destination IP address 302 at the IP layer and in the authority header 308.

Example Architecture

Figure 4:
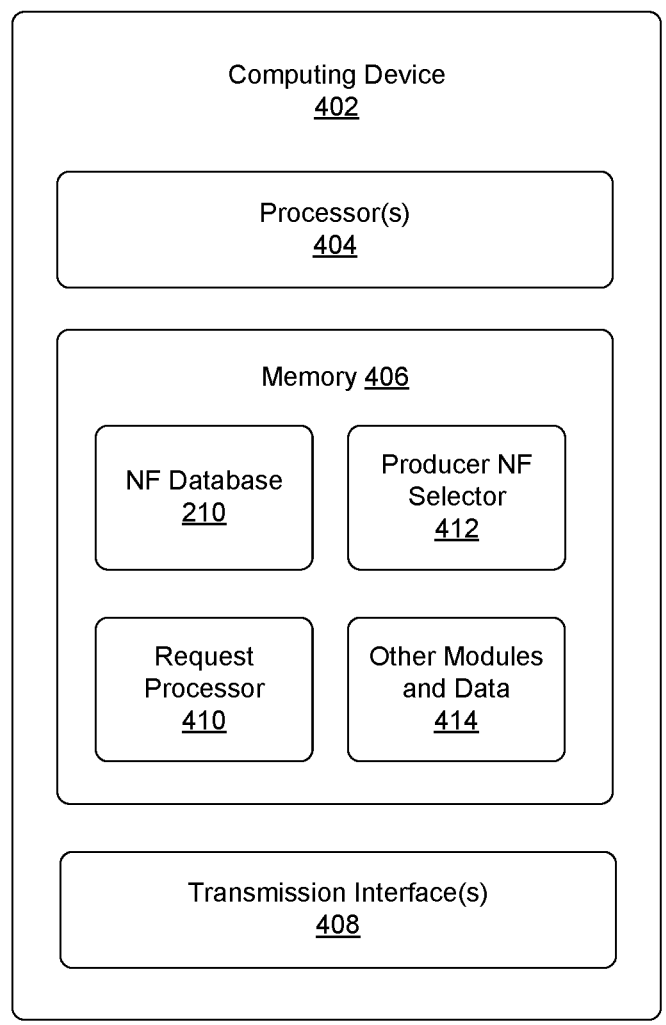
FIG. 4 depicts an example system architecture for a computing device that be, or execute, a proxy.

FIG. 4 depicts an example system architecture for a computing device 402 that be, or execute, a proxy 208 in accordance with various examples. For example, the computing device 402 can be a dedicated hardware proxy 208, a dedicated hardware element that executes a proxy 208 as software, or a hardware element such as a server that runs one or more instances of a proxy 208 as virtualized functions. As shown, the computing device 402 can include processor(s) 404, memory 406, and transmission interfaces 408.

In various examples, the processor(s) 404 can be a central processing unit (CPU), a graphics processing unit (GPU), both CPU and GPU, or any other type of processing unit. Each of the one or more processor(s) 404 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 404 may also be responsible for executing all computer applications stored in the memory 406, which can be associated with common types of volatile (RAM) and/or nonvolatile (ROM) memory.

In various examples, memory 406 can include system memory, which may be volatile (such as RAM), non-volatile (such as ROM, flash memory, etc.) or some combination of the two. The memory 406 can also include additional data storage devices (removable and/or non-removable) such as, for example, magnetic disks, optical disks, or tape. Memory 406 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store information and which can be accessed by the computing device 402. Any such non-transitory computer-readable media may be part of the computing device 402.

The memory 406 can store computer-readable instructions and/or other data associated with a proxy 208, including an NF database 210, a request processor 410, a producer NF selector 412, and/or other modules and data 414. As discussed above, the NF database 210 can store information associating IP addresses associated with instances of producers NFs 206, and/or services offered by such instances of producer NFs 206. In some examples, the NF database 210 can also store load balancing information and/or session information.

The request processor 410 can be configured to find the path header 310 of a request 204 received from a consumer NF 202, and to examine the path header 310 to identify a type of producer NF 206 and/or type of service that is indicated within the path header 310. For example, the request processor 410 can perform string analysis operations to parse or extract substrings from a string in the path header 310, and can determine whether one or more portions of the string in the path header 310 match predetermined strings or sets of characters associated with types of producer NFs 206 and/or types of services offered by those producer NFs 206. When the request processor 410 determines that the path header 310 indicates a type of producer NF 206 and/or a type of service, in some examples a producer NF selector 412 can select an IP address for a corresponding producer NF 206. The request processor 410 can modify the request 204 based on the selection of the IP address for a producer NF 206, by changing the authority header 308 to reflect the selected IP address for the producer NF 206 and by indicating the selected IP address for the producer NF in the destination IP address 302 at the IP layer.

The producer NF selector 412 can be configured to select a producer NF 206, and an IP address for the selected producer NF 206, for a consumer NF 202 based on information within a path header 310 of a request 204 indicating a type of producer NF 206 and a type of service being requested. For example, when a request processor 410 determines that a path header 310 indicates a particular type of producer NF 206 and a particular type of service, the producer NF selector 412 can use information in the NF database 210 to select a particular instance of that type of producer NF 206. The producer NF selector 412 can also use information in the NF database 210 to select an IP address of the selected instance of the producer NF 206 that corresponds to the type of service indicated in the path header 310. In some examples, the producer NF selector 412 can perform load balancing operations based on load balancing information in the NF database 210 when selecting an instance of the producer NF 206 for a consumer NF 202. In other examples, if session information in the NF database 210 indicates that a consumer NF 202 had previously been connected to an instance of a producer NF 206 for a service that matches the type of producer NF 206 and type of service indicated in a path header 310 of a new request 204, the producer NF selector 412 can select that same instance of the producer NF 206 for the consumer NF 202 in response to the new request 204.

The other modules and data 414 can be utilized by the computing device 402 to perform or enable performing any action taken by the proxy 208 and/or the computing device 402. The modules and data 414 can include a platform, operating system, and/or applications, and data utilized by the platform, operating system, and/or applications.

The transmission interfaces 408 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable a proxy 208 executed by the proxy 208 to communicate with other elements in the telecommunication network, including NFs 102 such as consumer NFs 202, producer NFs 206, and an NRF 212. For example, the transmission interfaces 408 can enable the proxy 208 to receive information about registered NFs 102 from an NRF 212, receive requests 204 from consumer NFs 202, and forward requests 204 to producer NFs 206.

Example Operations

Figure 5:
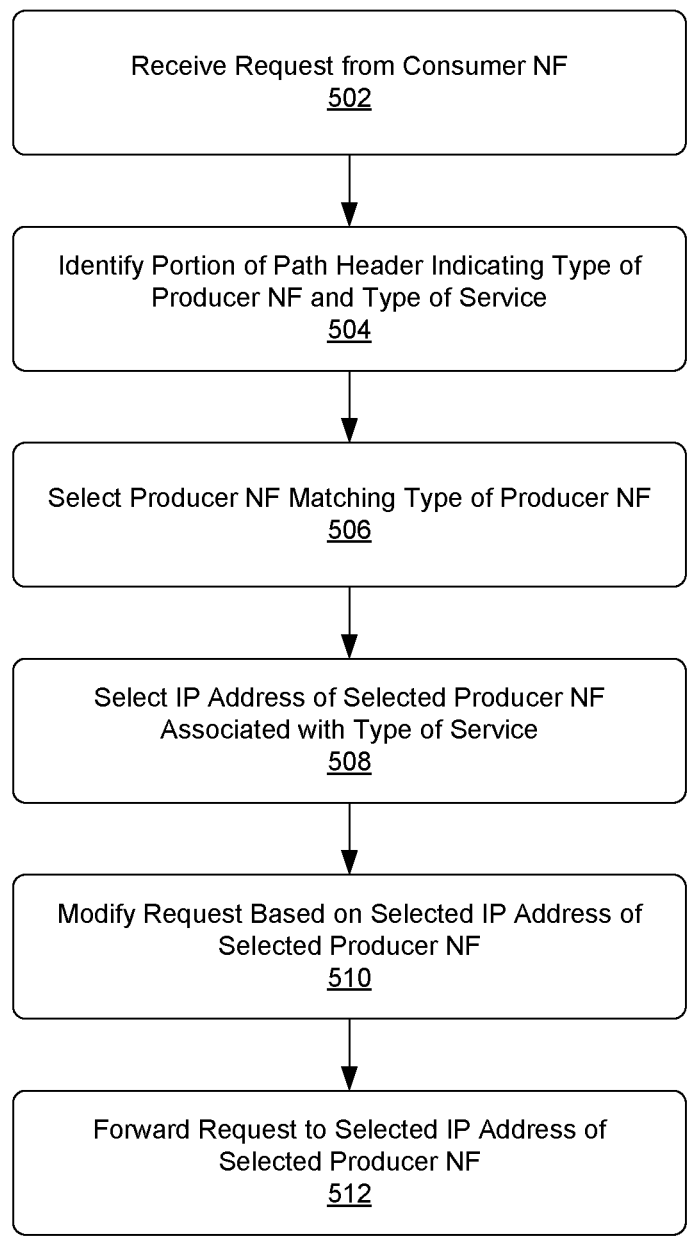
FIG. 5 depicts a flowchart of a process by which a proxy can route a request from a consumer NF to a producer NF in a telecommunication network.

FIG. 5 depicts a flowchart of a process by which a proxy 208 can route a request 204 from a consumer NF 202 to a producer NF 206 in a telecommunication network. At block 502, the proxy 208 can receive a request 204 from a consumer NF 202. The request 204 can be addressed at an IP layer to an IP address of the proxy 208. For example, the IP address of the proxy 208 can be indicated as a destination IP address 302 of the request 204.

At block 504, the proxy 208 can examine the request 204 to identify a type of producer NF 206 and a type of service indicated by at least a portion of a path header 310 of the request 204. For example, the path header 310 can be HTTP/2 pseudo-header string, such as ":path: /USEast/npcf-smpolicycontrol/v1/sm-policies." In this example, the proxy 208 can parse or extract the substring "npcf-smpolicycontrol" from the path header 310 and determine that "npcf" within the substring indicates that the type of producer NF 206 associated with the request 204 is a PCF, and that "smpolicycontrol" within the substring indicates that the type of service associated with the request 204 is a Session Management Policy Control Service.

At block 506, the proxy 208 can select a particular instance of a producer NF 206 that corresponds to the type of producer NF 206 indicated by the path header 310. For example, the telecommunication network may have multiple instances of that type of producer NF 206 in an NF set that can all provide the requested service. However, the proxy 208 can select a particular one of those instances of the producer NF 206 from the NF set for the consumer NF 202. In some examples, an NF database 210 may identify instances of a producer NF 206 in an NF set corresponding to the type of producer NF 206 indicated by the path header 310 that are available to be selected. In some examples, the proxy 208 can select the particular instance of the producer NF 206 from an NF set based at least in part on load balancing information in an NF database 210. In other examples, the proxy 208 may select an instance of the producer NF 206 based on session information in an NF database 210 that indicates the consumer NF 202 has previously been connected to that instance of the producer NF 206.

At block 508, the proxy 208 can use IP information in the NF database 210 to select an IP address for the selected producer NF 206 that corresponds to the type of service indicated by the path header 310. For example, the NF database 210 can store distinct IP addresses associated with different services offered by the selected producer NF 206, and the proxy can accordingly select one of those IP addresses that is associated with the type of service indicated within the path header 310 of the request 204.

At block 510, the proxy 208 can modify the request 204 based on the IP address selected during block 508. For example, the proxy 208 can modify the authority header 308 of the request to indicate the selected IP address that is associated with the requested service and the selected instance of the producer NF 206. Accordingly, although the authority header 308 of the request 204 may indicate an IP address of the proxy 208 when the proxy 208 receives the request 204 at block 502, the proxy 208 can change the authority header 308 to instead indicate an IP address of a producer NF 206 selected by the proxy 208 that corresponds to the requested service. The proxy 208 can also modify the destination IP address 302 of the request 204 at the IP layer from the IP address of the proxy to the selected IP address to re-address the request 204 to the selected producer NF 206.

At block 512, after modifying the request 204, the proxy 208 can forward the request 204 through the telecommunication network to the selected IP address of the selected producer NF 206. For example, the request 204 can be routed from the proxy 208 through the telecommunication network to the producer NF 206 based on the destination IP address 302 of the request 204 at the IP layer now indicating the selected IP address of the selected producer NF 206.

Conclusion

Overall, the systems and methods described herein can delegate discovery and/or selection of a producer NF 206 for a consumer NF 202 to a proxy 208. The configuration of the consumer NF 202 can accordingly be simplified, as the consumer NF 202 does not need to be configured with numerous IP addresses of potential producer NFs 206 from which the consumer NF 202 may obtain services. The consumer NF 202 may only need to be configured with, or obtain, an IP address of the proxy 208. The consumer NF 202 may also only need to indicate a type of producer NF 206 and a type of service in a path header 310 of a request 204, without selecting a particular instance of that type of producer NF 206 or specifying a particular IP address for a particular instance of that type of producer NF 206 in an authority header 308 of the request.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
 receiving, at a proxy of a telecommunication network, a request from a consumer network function (NF) of the telecommunication network that is addressed at an Internet Protocol (IP) layer to a first IP address of the proxy;
 determining, by the proxy, a type of producer NF indicated by a path header of the request;
 determining, by the proxy, a service indicated by the path header of the request;
 selecting, by the proxy, a producer NF that corresponds to the type of producer NF indicated by the path header;
 selecting, by the proxy, a second IP address of the producer NF that corresponds to the service indicated by the path header; and
 forwarding, by the proxy, the request to the producer NF using the second IP address.

2. The method of claim 1, wherein the path header comprises at least one substring that indicates the type of producer NF and the service.

3. The method of claim 1, wherein the request is a Hypertext Transfer Protocol Two (HTTP/2) message and the path header is in a path pseudo-header field of the HTTP/2 message.

4. The method of claim 1, further comprising modifying, by the proxy, an authority header of the request from indicating the first IP address of the proxy to indicating the second IP address of the producer NF.

5. The method of claim 4, wherein the request is a Hypertext Transfer Protocol Two (HTTP/2) message and the authority header is in an authority pseudo-header field of the HTTP/2 message.

6. The method of claim 1, wherein the proxy selects the producer NF from an NF set corresponding to the type of producer NF indicated by the path header based on load balancing information associated with the NF set.

7. The method of claim 1, wherein the proxy selects the producer NF from an NF set corresponding to the type of producer NF indicated by the path header based on session information indicating that the consumer NF had previously been connected to the producer NF.

8. The method of claim 1, wherein the proxy obtains a set of IP addresses associated with the type of producer NF indicated by the path header from a Network Repository Function (NRF) of the telecommunication network.

9. The method of claim 8, wherein the set of IP addresses includes distinct IP addresses associated with different services offered by the type of producer NF including the service.

10. The method of claim 1, wherein the telecommunication network is a fifth generation (5G) network.

11. A computing device of a telecommunication network comprising:
one or more processors;
memory storing computer-executable instructions for a proxy that, when executed by the one or more processors, cause the proxy to perform operations comprising:
receiving a request from a consumer network function (NF) of the telecommunication network that is addressed at an Internet Protocol (IP) layer to a first IP address of the proxy;
determining a type of producer NF indicated by a path header of the request;
determining a service indicated by the path header of the request;
selecting a producer NF that corresponds to the type of producer NF indicated by the path header;
selecting a second IP address of the producer NF that corresponds to the service indicated by the path header; and
forwarding the request to the producer NF using the second IP address.

12. The computing device of claim 11, wherein the path header comprises at least one substring that indicates the type of producer NF and the service.

13. The computing device of claim 11, wherein the request is a Hypertext Transfer Protocol Two (HTTP/2) message and the path header is in a path pseudo-header field of the HTTP/2 message.

14. The computing device of claim 11, wherein the operations further comprise modifying an authority header of the request from indicating the first IP address of the proxy to indicating the second IP address of the producer NF.

15. The computing device of claim 11, wherein the telecommunication network is a fifth generation (5G) network.

16. One or more non-transitory computer-readable media storing computer-executable instructions for a proxy that, when executed by one or more processors of a computing device of a telecommunication network, cause the computing device to perform operations for the proxy comprising:
receiving a request from a consumer network function (NF) of the telecommunication network that is addressed at an Internet Protocol (IP) layer to a first IP address of the proxy;
determining a type of producer NF indicated by a path header of the request;
determining a service indicated by the path header of the request;
selecting a producer NF that corresponds to the type of producer NF indicated by the path header;
selecting a second IP address of the producer NF that corresponds to the service indicated by the path header; and
forwarding the request to the producer NF using the second IP address.

17. The one or more non-transitory computer-readable media of claim 16, wherein the path header comprises at least one substring that indicates the type of producer NF and the service.

18. The one or more non-transitory computer-readable media of claim 16, wherein the request is a Hypertext Transfer Protocol Two (HTTP/2) message and the path header is in a path pseudo-header field of the HTTP/2 message.

19. The one or more non-transitory computer-readable media of claim 16, wherein the operations further comprise modifying an authority header of the request from indicating the first IP address of the proxy to indicating the second IP address of the producer NF.

20. The one or more non-transitory computer-readable media of claim 16, wherein the telecommunication network is a fifth generation (5G) network.

* * * * *